Oct. 4, 1960  F. G. J. GRISÉ  2,954,995
RESILIENT LATCH-OPERATING MECHANISM FOR DUMP TRUCK TAIL GATES
Filed April 13, 1956  3 Sheets-Sheet 1

INVENTOR
FREDERICK G.J. GRISÉ

BY William S. Dorman
ATTORNEY

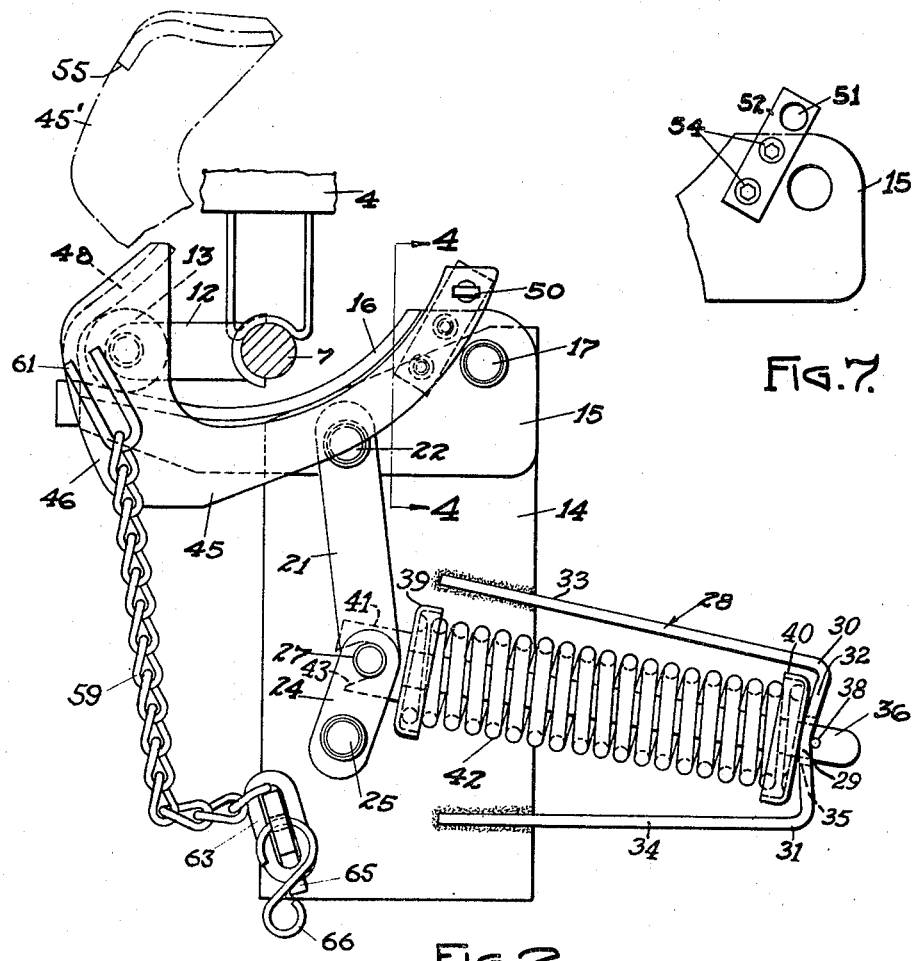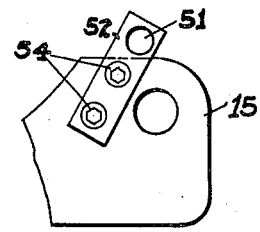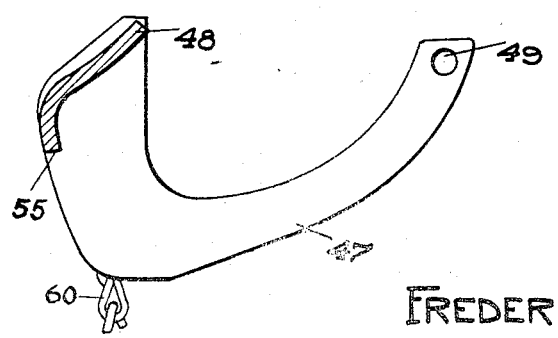

Oct. 4, 1960 F. G. J. GRISÉ 2,954,995
RESILIENT LATCH-OPERATING MECHANISM FOR DUMP TRUCK TAIL GATES
Filed April 13, 1956 3 Sheets-Sheet 3

INVENTOR
FREDERICK G. J. GRISÉ

BY *William S. Dorman*
ATTORNEY

United States Patent Office 2,954,995
Patented Oct. 4, 1960

2,954,995

RESILIENT LATCH-OPERATING MECHANISM FOR DUMP TRUCK TAIL GATES

Frederick G. J. Grisé, New Braintree, Mass., assignor to The U.N. Company, Inc., Boston, Mass., a corporation of Massachusetts Filed Apr. 13, 1956, Ser. No. 578,091

5 Claims. (Cl. 298—23)

This application is a continuation-in-part of my copending application Serial No. 422,481, filed April 12, 1954, now abandoned, for a Tail Gate Latch (originally entitled Tail Gate Latching Attachment for Dump Trucks). My other co-pending application Serial No. 450,690, filed August 18, 1954, for Tail Gate Latching Attachment for Dump Trucks is now also abandoned.

This invention relates to the automatic unlatching and latching of the tail gates of dump trucks, in response to the upward tilting and reverse movements of the truck body. More particularly, the invention contemplates mechanism for this purpose so organized that its elements can be readily applied as attachments to any conventional dump truck, without necessitating any changes in the latter's existing structure or in the arrangement of its conventional manually operated tail gate latching devices.

Nearly all of the conventional dump trucks in use today have their tail gates equipped with a manually operated latching device, which is actuated by a hand lever located at the forward end of the tiltable dump body. Since this hand lever is not accessible from the cab of the truck, the operator has to climb out of the cab each time he wishes to lock or unlock the tail gate.

There have been many attempts in the past to make these tail gate unlatching and latching operations automatic, in response to the upward tilting and reverse movements of the dump body. But most of these proposals have involved expensive and drastic changes in the existing conventional manually operable latching devices; moreover, they have made no provision for the selective disablement of the automatic operation, so as to allow for ordinary manual locking and unlocking of the tail gate, in those situations when it is found desirable to do so.

Furthermore, in all such prior proposals for automatic tail gate locking, on the dump body's return or downward movement, the parts are inevitably exposed to serious damage or breakage, whenever the tail gate's movement to fully closed position is obstructed by a large stone or other similar obstacle. Also, in none of such prior proposals for automatic tail gate unlocking, on the dump body's upward tilting movement, is there any safeguard against premature unlocking of the tail gate (with consequent unwanted dumping of some of the body's load) in cases where the body undergoes excessive jouncing or bouncing from travel of the truck over rough terrain.

My invention, as hereinafter described in detail, overcomes and eliminates all of the above described shortcomings and disadvantages of prior proposals for automatic locking and unlocking of the tail gates of dump trucks.

Other and further objects and advantageous features of this invention will hereinafter more fully appear in connection with a detailed description of the drawings in which Fig. 1 is a side elevational view showing the attachments of my invention as applied to dump truck elements, including manually operated tail gate latching devices, of ordinary and usual construction.

Fig. 2 is an enlarged front view of the novel tail gate latch operating attachments of the instant invention.

Fig. 6 is a sectional view taken along section line 6—6 of Fig. 3, showing one-half of the novel unlocking arm.

Fig. 7 is a fragmentary view of the upper right-hand corner of Fig. 2 showing the relationship between the fulcrum block for the unlocking arm and the pivotal cam plate.

Figure 1:
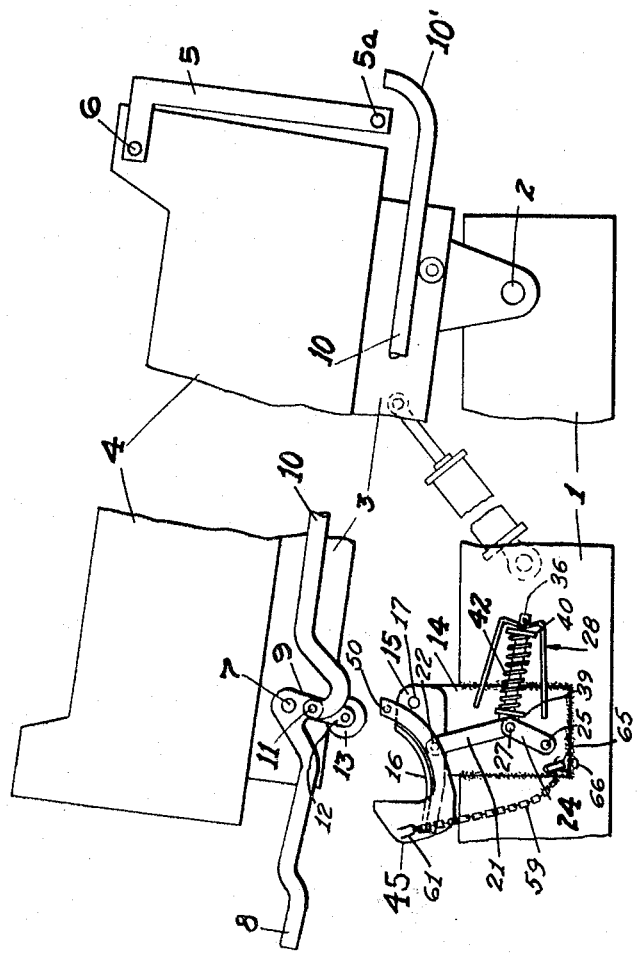

Referring to the drawings in detail, Fig. 1 shows the rear portion of a conventional dump truck to which the device of this invention is attached. The dump truck structure, as illustrated, includes a chassis frame 1, a subframe 3 pivotally mounted on the chassis frame at 2, and a dump body 4 mounted on the subframe 3. Mechanical or hydraulic means (not shown) connected between the chassis frame 1 and the subframe 3 (or the dump body 4) is used to raise and lower the dump body in a conventional manner. A tail gate 5 is pivotally connected at its upper end, as at 6, to the rear end of the dump body 4, said tail gate, for latching purposes, having near its lower end a pair of pins 5a (only one being shown) that project laterally from its opposite side edges.

Fig. 1 shows schematically the usual and ordinary manually operated devices for the latching and unlatching of such a tail gate. These devices include a transverse shaft 7, suitably journaled in the forward portion of subframe 3, and having a hand lever 8 for its back and forth rocking by the truck driver. They also include a pair of parallel elongated draw rods 10 (only one being shown) which flank the subframe 3 and are suitably supported for endwise movement, each said rod at its rear end having an upturned hook portion 10′ for engagement with the adjacent laterally projecting pin 5a of the tail gate. At its forward end, each rod 10 is connected by a pivot pin 11, to an arm 9 extending radially from the rock shaft 7, one such arm, as herein shown, being formed integrally with the hand lever 8 of said rock shaft. When hand lever 8 is moved forward and downward, to the position shown in Fig. 1, the resultant counterclockwise turning of shaft 7 thrusts the rods 10 rearwardly, thereby to space their hooks 10′ from the projecting pins 5a of the tail gate, so as to free the latter for swinging movement into open position. When hand lever 8, from the position shown in Fig. 1 is moved upward and rearward, the resultant clockwise turning of shaft 7 draws the rods 10 forwardly, thereby to engage their hooks 10′ with the pins 5a of the tail gate, so as to move the latter to closed position and to hold it there.

In rendering automatic the unlatching and latching of the tail gate, the instant invention contemplates no changes or rearrangements of any kind in the above described wholly conventional devices which are typical of the standard equipment, furnished in a great majority of dump trucks, for securing manual latching and unlatching of the tail gate. The instant invention involves the addition to such standard equipment, of two cooperating devices or units which are best shown in Fig. 2; these are (1) a depending radial arm 12, welded or otherwise secured at its upper end to the conventional rock shaft 7, said arm at its other end providing a roller 13, and (2) the other mechanism shown by Fig. 2, all of which is mounted on an upright plate or bracket 14, that is secured (see Fig. 1) to the truck chassis 1, by welding or the like, in underlying relation to said arm 12.

For cooperation with arm 12, the bracket 14 at its upper end carries a horizontally extending cam plate 15, whose concave upper edge provides a cam track 16 adapted to be engaged, and traversed from right to left, by the roller 13 of arm 12, during the final portion of the dump body's descent to its normal horizontal position, as depicted in Fig. 2. The cam plate 15, instead of being rigidly attached to bracket 14, is pivotally attached to said bracket by a suitable pivot pin 17, being supported in its illustrated generally horizontal operative position by spring pressure exerted against a toggle linkage, as hereinafter described. This means of support has two outstanding advantages, namely (1) in the automatic latching operation, when the tail gate's full closure is impeded by the presence of a rock or other obstacle, the cam plate 15 is able to yield downwardly, under pressure from the descending arm 12, in sufficient amount to prevent breakage of or damage to the latching devices by continued clockwise rocking of shaft 7, and (2) it enables the truck operator, by a simple manipulation, to relieve the toggle linkage of all spring pressure, so that the cam plate 15 drops down into a wholly inoperative position, out of the path of the descending arm 12. This allows the latching and unlatching of tail gate 4 to be controlled manually by manipulation of hand lever 8, which is highly advantageous for such truck operations as sanding or asphalting of roadways.

The toggle joint linkage of the cam plate's supporting means comprises a pair of parallel depending elongated links 21, 21 which are pivoted to cam plate 15, on opposite sides thereof, by a common pivot pin 22. The lower ends of links 21, 21 are pivotally connected to the upper ends of a pair of parallel shorter links 24, 24, by a pivot pin 27 which is common to all four of said links. The links 24, 24 are connected at their lower ends to the bracket 14 by a common pivot pin 25. The two sets of links 21 and 24 thus provide a toggle joint whose "knee" (the pivot pin 27) is normally maintained in the position shown by Fig. 2, for support of cam plate 15 in its illustrated operative position, by a preloaded spring device of special construction now to be described.

As shown in Fig. 2, the bracket 14, to the right of the above described toggle linkage, carries a horizontally disposed generally U-shaped spring support member 28. The latter may consist, as here shown, of a single elongated piece of flat metal stock, having spaced-apart substantially 90° bends at 30 and 31 to form a pair of slightly divergent legs 33 and 34 whose end portions are strongly welded, or otherwise firmly secured, to the face of bracket 14. Midway of said bends 30 and 31, the base 32 of this U-shaped member 28 is given a slight reverse bend 29, such as to present externally at this closed end of said member, a shallow transverse depression, for a purpose now to be described.

Said base portion 32 is centrally apertured, as shown at 35, for passage loosely therethrough of the right-hand end of an elongated bar 36. Said bar's projecting end portion is suitably apertured, to receive and hold a transverse retaining pin 38 that seats as shown in the shallow external groove or depression of base portion 32 which is formed as above described by the bend 29. At its opposite (left-hand) end, the elongated bar 36 is provided with a substantially flat generally rectangular enlargement 41, the material of which, from the end and lower edges, is cut back, as shown in Fig. 2, to provide an upwardly sloping notch 43, of slightly greater width than the diameter of the pivot pin 27 that provides the "knee" of the toggle linkage 21, 24.

Before the right-hand end of bar 36 is entered in aperture 35 of support member 28, the following three elements are assembled upon and along said bar, in this order—first, a cup-shaped spring seat 39, which bears against the inner edge or shoulder provided by bar enlargement 41; second, an elongated helical spring 42; and third, another cup-shaped spring seat 40, whose outer surface is adapted to bear against the internal surface of the base portion 32 of support member 28. In uniting this assembly with the support member 28, the spring 42 is put under an appreciable preload; that is to say, it is necessary for said spring to be considerably compressed, in order to put the hole, at the right-hand end of bar 36, in position to receive the pin 38.

With the notch 43 of bar 36 hooked over the "knee" pin 27 of the toggle linkage, as shown in Fig. 2, a firm adequate and relatively rigid support of cam plate 15 in its illustrated operative position is always assured. However, if the truck operator desires, for any reason, to discontinue temporarily the automatic latching of the tail gate which this cam plate obtains, he needs only to rock upward very slightly this spring assembly, about the fulcrum provided by its transverse pin 38, in order to disengage the notch 43 from the "knee" pin 27 of the toggle linkage. This allows said linkage to be shifted to the left, so as to swing the cam plate downwardly to a position entirely below the path of the roller 13 of arm 12.

When the dump body 4 is lowered from the position shown in Fig. 1 to its horizontal or transport position, the tail gate will pivot about 6 to close the end of the dump body. At the same time, roller 13 will engage and traverse from right to left the elongated concave cam surface 16 of cam plate 15 so as to turn the shaft 7 in a clockwise direction until the arm 12 and roller 13 occupy the position shown in Fig. 2. Such a movement of the rocker shaft 7 will draw rods 10 forwardly so that their hooks 10' engage and move to closed position the pins 5a of the tail gate 5. In the fully closed position, the roller-supporting arm will be horizontal, the hand lever will be vertical, and pin 11 will be above and ahead of the central axis of rocker shaft 7. (Pin 11 is described in this position as being "beyond dead center.") The dump body is now closed and locked. Even if the body were now elevated (in the absence of the hereinafter described unlatching device), the tail gate would remain closed by virtue of the fact that pin 11 is beyond dead center. Thus the closing and locking action is made completely automatic. The purpose of supporting cam plate 15 by the pre-loaded spring 42 is to permit a compensatory and temporary downward displacement of said plate at such times that large stones or other obstructions may become lodged in the tail gate. This latter safety feature prevents breakage of my device or the various parts of the latching mechanism itself.

My invention also includes a tail gate unlatching device, designated generally by the numeral 45. The essential element of this device is a tripping member 48, which (see Fig. 2) is supported in overlying relation to the roller 13 of arm 12, when said roller, as described above, has completed its traverse of the cam track 16. Said tripping member 48 is here shown as bridging the forward ends of a pair of elongated spaced apart matching arms 46 and 47. The forward ends of said arms 46 and 47 extend upwardly and are bent outwardly to provide clearance for the roller 13, as will later appear. The under surface of tripping member 48, as best shown in Fig. 2, will overlie the roller 13 when the dump body is in its completely lowered position. The lower edge 55 of the tripping member rests against the extreme forward end of the cam surface 16.

Figure 4:
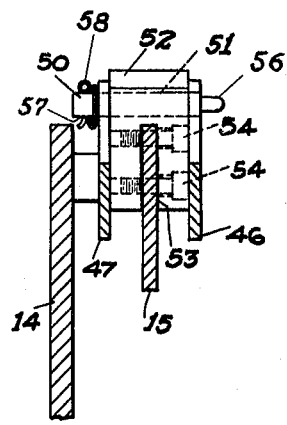
Fig. 4 is a left-hand sectional view taken along section line 4—4 of Fig. 2.
Figure 5:
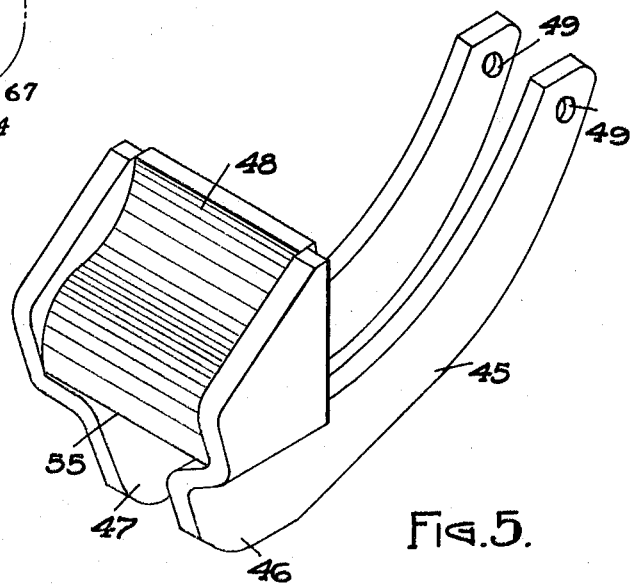
Fig. 5 is a larger scale perspective view of the unlocking arm of this invention.

The rear ends of arms 46 and 47 are considerably closer together so as to permit pivotal attachment to the cam plate 15. A pair of aligned holes 49 in the rear ends of arms 46 and 47 are adapted to receive a pin 50 which also passes through a corresponding hole 51 in a small rectangular fulcrum block 52. As best shown in Figs. 4 and 7, the cam plate 15 fits into a vertical notch 53 in this fulcrum block 52. A pair of countersunk screws 54 passing through opposed holes in the cam plate 15 and in the block 52 hold the latter two elements together. Pin 50 is flattened at one end at 56 thus forming a "head" wider than the holes 49 or 51. At the other end of pin 50 a hole 57 is adapted to receive a cotter pin 58. It should be apparent, therefore, that the flattened end 56 and the cotter pin 58 will prevent the pin 50 from slipping out of position.

The unlocking device 45 is shown as being pivotally attached to the cam plate 15 through the medium of the fulcrum block 52. However, it should be pointed out that other pivotal mounting means might be employed for this unlocking device apart from that illustrated herein. For example, arms 46 and 47 of the unlocking device 45 might be pivotally attached to the pin 17, such that the unlocking device and the cam plate 15 would have a common pivotal axis. Also, the unlocking device might be pivotally attached to the bracket itself (or even to the chassis frame itself) by a pivotal connection which would be entirely independent of the cam plate.

Figure 3:
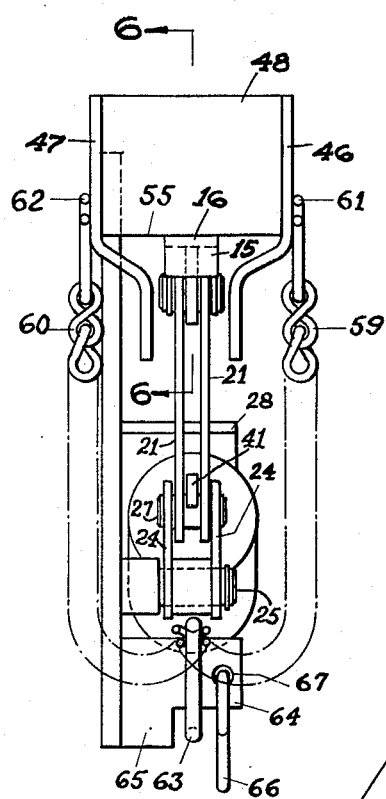
Fig. 3 is a left-hand side view taken from Fig. 2.

At the forward end of the unlocking device 45 a pair of chains 59 and 60 (of equal length) are welded at their upper ends 61 and 62 to the outer surfaces of arms 46 and 47, respectively. At their lower ends these chains are connected to a common link 63 which is larger than the individual links of chains 59 and 60. Large link 63 is adapted to fit over the projecting end 64 of a short plate 65 which is welded to the bracket 14. A curved pin 66 will fit into a hole 67 in the plate 65 to hold the link 63 in position. As shown in Figs. 2 and 3, the chains 59 and 60 are of sufficient length to provide a small amount of "slack" between the arms 46 and 47 and the lower plate 65 when the edge 55 of the tripping member 48 is resting against the cam track 16. However, if the chains 59 and 60 were extended to their full lengths by pulling upwardly on the forward end of the unlocking device 45, the latter element could be raised as far as the dotted line position 45' shown in Fig. 2. This dotted line position actually represents the operative unlocking position of the unlocking device itself.

The operation of the unlocking device per se can be best explained by describing the sequence of operations involved in a consecutive lowering and raising of the dump body, starting from an initial raised position. First of all, it is assumed that the dump body 4 is elevated, the load has been dumped, and the tail gate 5 is open. Now, as the body is gradually lowered toward the chassis frame 1, the roller 13 approaches the cam track 16.

After the roller contacts the cam track, continued lowering of the dump body will cause the roller to move towards the left along the cam track, while at the same time the rocker shaft 7 is turned in a clockwise direction. (These directions relate to the positions of the elements as shown in Figs. 1 and 2). When the dump body is in its completely lowered position the roller 13 will have moved to its extreme left-hand position under the tripping member 48 of the unlocking device 45; also, in this completely lowered position the tail gate will be closed and locked, as explained earlier. If the dump body should now be elevated, the tail gate would not be unlocked immediately, since the pin 11 is beyond "dead center." The weight of the unlocking device 45 is not sufficient, by itself, to turn the arm 12 to its tail gate releasing position. Therefore, as the dump body is elevated, the tripping member 48 will ride on the upper surface of roller 13 until the unlocking device 45 pivots to the dotted line position shown in Fig. 2. At this point, with the chains 59 and 60 drawn taut, so as to prevent further upward movement of the unlocking device 45, the tripping member 48 becomes in effect a fixed detent in the path of roller 13. Thus the dump body's continued upward tilting movement beyond this point, causes a downward or counterclockwise displacement of said roller and its arm 12, which is of sufficient magnitude to rock the shaft 7 counterclockwise, for the unlatching or "tripping" of the tail gate 5.

It should be apparent, from the above, that the novel unlocking device of this invention provides for several degrees of upward movement of the dump body during which the tail gate remains locked. Therefore, from its completely lowered transport position, the dump body can bounce upwardly several degrees (or about 3 to 4 inches at the location of the unlocking device) without causing premature or accidental unlatching or tripping of the tail gate. Of course, the chains 59 and 60 might be made longer or shorter than those shown herein, depending upon the characteristics (bouncing propensities) of any given dump truck.

Also, by virtue of the fact that the lowermost edge 55 of the tripping member 48 rests on the cam track, the unlatching device 45 does not interfere in any way with my invention's safety feature; that is, if for any reason, a lowering of the dump body should occur when the tail gate was locked (a condition not ordinarily arising in the normal operation of a dump truck), the roller-supporting arm 12 would strike against the upper edge of the tripping member 48; this force would be transmitted through the cam plate 15, through links 21 and 24, and to the spring 42; Therefore, the spring would yield temporarily, just as described above and prevent any breakage of the various parts.

Many other changes, apart from those illustrated or described herein, might be made within the spirit of this invention.

I claim:

1. Automatic latching mechanism for the pivoted gravity-pendent tail gate of a tilting body dump truck having its axis of tilt near its tail-gate end, said mechanism being of the class which includes a cross shaft mounted in the other up-tilting end of the body, a tail gate latch connected to said cross shaft, said cross shaft being rockable manually in opposite directions for the latching and unlatching of the tail gate, and an arm secured to and depending from said cross shaft in substantially the same vertical plane as a cam plate secured to the truck frame, such that near the finish of the lowering movement of the body to level or transport position the arm contacts with and is swung by said cam plate to rock the cross shaft in a direction to latch the tail gate in its closed position, and characterized by the fact that the cam plate has a pivotal attachment to the truck frame, to permit its movement into and out of arm-engaging position, and is supported in its arm-engaging position by pre-loaded spring means secured on said truck frame, whereby to yield downwardly by movement about its pivotal attachment in the event of any undue obstructions to the tail gate's movement into fully closed position.

2. Automatic latching mechanism for a dump truck's tail gate as claimed in claim 1, in which, for support of said cam plate in arm-engaging position, the pre-loaded spring means is borne against by the knee of a toggle joint, having an upper link pivotally connected to the cam plate, and a lower link pivotally connected to the truck frame.

3. Automatic latching mechanism for a dump truck's tail gate as claimed in claim 2, in which the toggle joint's knee has a detachable pin-and-slot connection with the pre-loaded spring means, to obtain by manual disconnection of the so-connected parts the collapse of said toggle joint, for lowering movement of the cam plate to inoperative position.

4. Automatic latching mechanism for a dump truck's tail gate as claimed in claim 1, which includes a tripping member supported by the truck frame and beneath which moves said arm's free end as it reaches the end of its traverse of the cam plate, whereby said arm, by encounter with said tripping member when the body is moved from transport position toward its up-tilted dumping position, is displaced in sufficient amount to rock said cross shaft in a direction to unlatch said tail gate.

5. Automatic latching and unlatching mechanism for a dump truck's tail gate as claimed in claim 4, in which the tripping member is pivotally mounted on the cam plate with its lower edge resting thereon, for free upward movement in unison with the arm, to prevent premature unlatching of the tail gate by upward bouncing of the dump body and means for limiting said upward movement of the tripping member, such as to obtain its operation of the arm for tail gate unlatching, at a predetermined intermediate point in the body's movement from transport position to up-tilted dumping position.

References Cited in the file of this patent

UNITED STATES PATENTS

| | | |
|---|---|---|
| 1,376,733 | Sanderson | May 3, 1921 |
| 1,797,343 | Hughes et al. | Mar. 24, 1931 |
| 2,009,466 | Yeager | July 30, 1935 |
| 2,174,956 | Allison | Oct. 3, 1939 |
| 2,261,745 | Sand | Nov. 4, 1941 |
| 2,505,425 | Newell | Apr. 25, 1950 |
| 2,552,442 | McClish | May 8, 1951 |

FOREIGN PATENTS

| | | |
|---|---|---|
| 143,979 | Australia | Oct. 26, 1951 |
| 476,394 | Canada | Aug. 28, 1951 |
| 190,739 | Germany | Oct. 1, 1907 |